United States Patent Office 3,505,269
Patented Apr. 7, 1970

3,505,269
EPOXY ACRYLIC COATING COMPOSITION MODIFIED WITH A TRIALKOXYSILANE
Jeffery J. Jeffery, Davison, and Frank Rohrbacher, Jr., Flint, Mich., assignors to E. I. du Pont de Nemours and Company, Wilmington, Del., a corporation of Delaware
No Drawing. Filed June 30, 1967, Ser. No. 650,194
Int. Cl. C08g 45/04, 45/16
U.S. Cl. 260—32.8                    23 Claims

ABSTRACT OF THE DISCLOSURE

Sealer compositions comprising binders dissolved in organic solvents wherein the binder comprises:
  (a) 50–99 parts of a high molecular weight epoxy resin;
  (b) 0–50 parts of an acrylic polymer; and
  (c) 1–25 parts of a trialkoxy-silane having the structural formula,

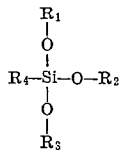

wherein $R_1$, $R_2$ and $R_3$ are individually selected from the group of methyl, ethyl and propyl and wherein $R_4$ is a monovalent radical which promotes adhesion. The sum of the binder components is 100 parts. A preferred silane is N-beta(aminoethyl)gamma-aminopropyl trimethoxy silane.

BACKGROUND OF THE INVENTION

This invention relates broadly to film-forming compositions and more particularly to sealer compositions.

Although sealer compositions are well known in the prior art, previously it has been difficult or impossible to provide a sealer composition which retained its chip-resistance properties over broad temperature ranges and particularly at low temperatures of around 0° F. Chip-resistance is the ability of a finish coating to withstand impact without chipping away from the substrate. In the automotive industry, this is particularly a problem because of the chipping away of automobile finishes caused by the frequent impacts from road pebbles, etc.

SUMMARY OF THE INVENTION

According to this invention, there is provided a sealer composition which comprises a binder dissolved in an organic solvent, the binder comprising the following components:
  (a) From about 50 to about 99 parts by weight of a high molecular weight epoxy resin;
  (b) From 0 to about 50 parts by weight of an acrylic polymer; and
  (c) From about 1 to about 25 parts by weight of a trialkoxysilane having a structural formula,

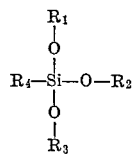

wherein $R_1$, $R_2$ and $R_3$ are individually selected from the group of methyl, ethyl and propyl, and wherein $R_4$ is a monovalent adhesion-promoting radical. The sum of the binder components is equal to 100 parts by weight.

A process for preparing these compositions is also provided which comprises:
  (a) Combining from about 1 to about 25 parts of a trialkoxysilane with an amount of organic solvent and either none or some amount of nonreactants, such that the concentration of trialkoxysilane is less than about 1 part of trialkoxysilane per 10 parts of organic solvent or per 10 parts of the sum of the organic solvent and nonreactants present;
  (b) Dissolving from no parts to about 50 parts of an acrylic polymer in the organic solvent; and
  (c) Dissolving from about 50 to about 99 parts of a high molecular weight epoxy resin in the organic solvent. The trialkoxysilane has the same structural formula as is disclosed above.

One advantage of the sealer compositions of this invention is that they provide better chip resistance than the sealer compositions of the prior art and do so with a greater degree of reliability over wide temperature variations. Another advantage is that the sealer compositions of this invention provide in general stronger bonds than prior art compositions between the substrate and coating they are joining. The sealer compositions of this invention also exhibit improved corrosion resistance properties over the compositions of the prior art.

DESCRIPTION OF THE INVENTION

Trialkoxy silanes useful for this invention have the structural formula.

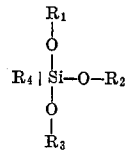

$R_1$, $R_2$ and $R_3$ in this formula can be methyl, ethyl or propyl and can be the same or different. $R_4$ is a monovalent adhesion-promoting radical. One embodiment of $R_4$ is where $R_4$ has the structural formula, $$-(CH_2)_m-R_5$$

wherein $m$ is an integer of 0 to 3 and $R_5$ has a structural formula selected from the group of:

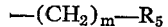
—CH$_2$NH$_2$
—CH$_2$N(C$_2$H$_4$OH)$_2$
—CH$_2$—NHCH$_2$CH$_2$NH$_2$

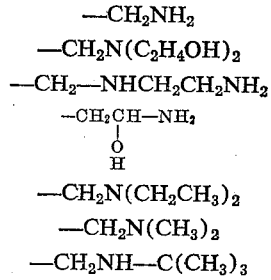

—CH$_2$N(CH$_2$CH$_3$)$_2$
—CH$_2$N(CH$_3$)$_2$
—CH$_2$NH—C(CH$_3$)$_3$ and

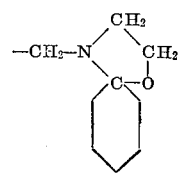

$R_5$ can also be any other monovalent radical which causes the resulting trialkoxy silane to exhibit good adhesion properties between high molecular weight epoxy resins and other organic substrates.

Good sealers can be prepared using the following trialkoxysilanes: N-bis(beta-hydroxyethyl)gamma - aminopropyl, gamma - aminopropyl, and N-beta(aminoethyl) gamma-aminopropyl.

Other examples of suitable trialkoxy silanes include:

N-beta(aminoethyl)gamma-aminopropyl trimethoxysilane
N-beta(aminoethyl)gamma-aminopropyl triethoxysilane
N-beta(aminoethyl)gamma-aminopropyl diethoxymethoxysilane
N-beta(aminoethyl)gamma-aminoethyl trimethoxysilane
N-beta(aminoethyl)gamma-aminoethyl tripropoxysilane
N-beta(amnioethyl)gamma-aminomethyl trimethoxysilane
N-bis(beta-hydroxyethyl)gamma-aminopropyl triethoxysilane
N-bis(beta-hydroxyethyl)gamma-aminoethyl trimethoxysilane
Gamma-aminopropyl triethoxysilane
Gamma-aminopropyl trimethoxysilane The preferred trialkoxysilane for this invention is N-beta(aminoethyl)gamma-aminopropyl trimethoxysilane which has the structural formula,

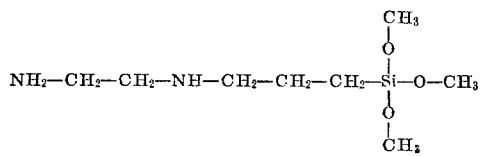

This is preferred because it exhibits an unusually high degree of adhesion to metals and organic substrates such as automotive sheet metal and high baked primers.

N-beta(aminoethyl)gamma - aminopropyl trimethoxysilane is commercially available from Union Carbide Corp., Silicones Division under the trade name A–1120 Silane.

Epoxies useful for this invention have, in general, high molecular weights ranging from about 20,000 to about 200,000. Because of the high molecular weight and linearity of these epoxy resins, they are very low in epoxide functionality.

The preferred epoxy resin is epichlorohydrin-bisphenol A polymer.

A more detailed description of high molecular weight epoxy resins suitable for use with this invention can be found in the copending application, Rohrbacher, U.S. Ser. No. 650,197, filed June 30, 1967, which is hereby expressly incorporated by reference.

Acrylic polymers suitable for use in the sealer compositions of this invention include both nonadhesion-promoting polymers and adhesion-promoting polymers.

Examples of suitable nonadhesion-promoting acrylic and nonacrylic polymers include polymers prepared from the following monomers: esters of acrylic acid or of methacrylic acid with alcohols having from 1 to 18 carbon atoms such as methyl acrylate or methacrylate, ethyl acrylate or methacrylate, propyl acrylate or methacrylate, isopropyl acrylate or methacrylate, the various butyl acrylates or methacrylates, cyclohexyl acrylate or methacrylate, benzyl acrylate or methacrylate, phenyl acrylate or methacrylate, n-hexyl, n-octyl, t-octyl, dodecyl, hexadecyl, or octadecyl acrylates or methacrylates, acrylonitrile, methacrylonitrile, acrylamide, methacrylamide, stryene, α-methyl styrene, vinyl toluenes, acrylic acid, acrylic acid anhydride, methacrylic acid, anhydride, maleic anhydride, fumaric acid, crotonic acid, allyl acetate, glycidyl methacrylate, t-butylaminoethyl methacrylate, hydroxyalkyl acrylate and methacrylates such as β-hydroxyethyl methacrylate, β-hydroxyethyl vinyl ether, β-hydroxyethyl vinyl sulfide, vinyl pyrrolidone, and N,N-dimethylaminoethyl methacrylate.

Examples of suitable adhesion-promoting polymers are described in the above incorporated application, Rohrbacher, U.S. Ser. No. 650,197, filed June 30, 1967.

3-(2-methacryloxyethyl)-2, 2-spirocyclohexyl oxazolidine is the preferred acrylic polymer because it is readily available, inexpensive and an excellent dispersion polymer.

Solvents preferred for this invention are glycol ethers such as ethylene glycol monoethyl ether, ethylene glycol monoethyl ether acetate, ethylene glycol monomethyl ether, etc. In addition, other organic solvents can be used in combination with these preferred solvents including: aromatic hydrocarbons such as toluene, xylene, substituted benzenes, and other analogues; alcohols such as methanol, ethanol, propanol and butanol; ketones such as methyl ethyl ketone, acetone, diethyl ketone and methyl isobutyl ketone. Methyl ethyl ketone with about 2% water also can be used.

The sealer compositions of this invention can contain other additives such as pigments, platicizers, surfactants, diluents, etc. Pigmentation up to 30% pigment volume concentration is often desirable. Suitable pigments include titanium dioxide, aluminum silicate, talc, carbon black, zinc, barium or strontium chromates, calicium carbonate, etc.

Plasticizers such as butyl benzyl phthalate can be added to improve flexibility. Examples of diluent resins suitable for use in these compositions are low molecular weight epoxies, short oil epoxy esters, polystyrenes, vinyl polymers, etc. Diluent liquids such as toluene, xylene, acetone, etc., are suitable.

The preferred sealer composition comprises a binder dissolved in a solvent system of ethylene glycol monoethyl ether, methyl ethyl ketone, toluene and acetone. The binder is comprised of:

(1) About 77 parts of epichlorohydrin-bisphenol A polymer with a molecular weight of about 200,000;

(2) About 18 parts of a 95/5 copolymer of methyl methacrylate/3 - (2-methacryloxy-ethyl) - 2,2-spirocyclohexyl oxazolidine;

(3) About 5 parts of N-beta(aminoethyl)gamma aminopropyl trimethoxy silane.

In the process for preparing the sealer compositions of this invention, it is important that the trialkoxy silane be diluted to a concentration of less than 10% based on the sum of the trialkoxy silane, organic solvent and non-reactants before it is contacted with the high molecular weight epoxy resin. For purposes of this invention, the term nonreactants is used to mean the acrylic polymer, any pigment present, or any other diluent or modifying resin present. The high molecular weight epoxy resin is not included in the term nonreactants.

After the trialkoxy silane is diluted sufficiently, the high molecular weight epoxy resin can be added either alone, after some acrylic polymer is added, before some acrylic polymer is added or simultaneously with some acrylic polymer.

Carrying the process out as described above avoids any appreciable amount of cross-linking involving the high molecular weight epoxy resins and polyfunctional silanes which normally results in an objectionable viscosity rise or gel formation,

EXAMPLE IA

Mill base

| | Parts |
|---|---|
| Ethylene glyocol monethyl ether | 29.15 |
| 95/5 copolymer of methyl methacrylate and 3 - (2-methacryloxyethyl)-2, 2-spirocyclohexyl oxazolidine: | |
|     40% solids in 3/1 toluene/actone | 21.56 |
| Pigments | 49.29 |
|     Aluminum silicate _____ 24.09 | |
|     Titanium dioxide _____ 24.25 | |
|     Carbon black _____ 0.95 | |
| Total | 100.00 |

The above formulation is ground in a sand mill to disperse the pigment in the organic binder and is let down to a finished product in mix tank equipment as follows:

| | Parts |
|---|---|
| Mill base | 7.13 |
| 95/3 copolymer of methyl methacrylate and 3 - (2-methacryloxyethyl-2), 2-spirocyclohexyl oxazolidine: | |
|     40% solids in 3/1 toluene/acetone | 4.61 |
| Actone | [1] 10.21 |
| N - beta(aminoethyl)gamma - aminopropyltrimethoxy silane | [2] .76 |
| Ethylene glycol monethyl ether | 10.20 |
| Toluene | [3] 6.07 |
| 200,000 molecular weight polymer of epichlorohydrin and bisphenol A: | |
|     36% solids in methyl ethyl ketone | [4] 29.43 |
| Toluene | [5] 31.59 |
| Total | 100.00 |

[1] Add mix ½ hour.
[2] Add slowly with mixing-mix ½ hour.
[3] Add mix until uniform.
[4] Add slowly with mixing-mix until uniform.
[5] Add with mixing-mix 1 hour.

The example sealer composition is reduced 100% by volume with a 30/30/35/5 blend of acetone/toluene/ethylene glycol monoethyl ether acetate/ethylene glycol monoethyl ether.

It is then spray applied with pressure or suction type spray gun equipment over baked automotive sheet metal primer. This primer being an alkyd based system modified with low molecular weight epoxy resin and/or nitrogen cross-linking resin, and having a pigment volume concentration of 15 to 25%. Said primer being applied on steel by dipping or flowing to a dry film thickness of 0.1 to 1.2 mils and baked in the order of 15 to 45 minutes at 350° F. to 425° F. The example sealer is applied to a dry film thickness of 0.1 to 0.5 mil. An automotive acrylic lacquer topcoat is then spray applied directly over the unbaked sealer. The lacquer topcoat is applied to a dry film thickness of 2.0 to 3.0 mils and baked for 20 to 30 minutes at 275° F. to 300° F.

Test panels were prepared in the above manner and compared to:

(1) A conventional acrylic based sealer; and
(2) A sealer identical to the example sealer except that it contains no N-beta(amino-ethyl)gamma-aminopropyltrimethoxy silane.

The test panels were then prepared under the following substrate conditions:

Substrates

Condition 1—Primer A (alkyd based epoxy modified) dipped and baked under laboratory conditions;
Condition 2—Primer B (alkyd based epoxy and nitrogen resin modified) dipped and backed under laboratory conditions;
Condition 3—Primer A—primer panel is prepared in a commercially operating flow coater and oven;
Condition 4—Primer A—primer panel is prepared in a second commercial installation;
Condition 5—Primer B—primer panel is prepared in a third commercial installation;
Condition 6—Primer B—primer panel is prepared in a fourth commercial installation; and
Condition 7—Sanded auto body steel.

The panels are tested at 0° F. using the Gravelometer Chip Test described below. The results are:

| | 0° F. Gravelometer Chip Rating | | |
|---|---|---|---|
| Substrate | Conventional Sealer | Example Sealer Without Trialkoxy Silane | Example Sealer |
| 1 | 6 | 8 | 9 |
| 2 | 5 | 8 | 8 |
| 3 | 6 | 8 | 8 |
| 4 | 4 | 6 | 8 |
| 5 | 5 | 7 | 8 |
| 6 | 3 | 4 | 8 |
| 7 | 4 | 9 | 9 |

TEST PROCEDURE FOR 0° F. GRAVELOMETER CHIP TEST

The test is conducted in a 0° F. normal atmosphere. The gravelometer consists of a device to hold a 4 in. x 12 in. test panel. A 2 in. horizontal air line fitted with a valve capable of supplying compressed air at at least 75 p.s.i. when the valve is wide open. The opened end of the air line is 8 in. from the test panel and pointed directly at it. The air line is fitted with a vertical 2 in. pipe 8 in. behind its opened end. The vertical pipe is 18 in. high with the upper end flared and fitted with a plug to accept 1 pint of gravel ⅜ in. to ⅝ in. in size.

To test the chip resistance of a system a 4 in. x 12 in. test panel is prepared. It is allowed to cool to 0° F. for a minimum of 2 hours. It is then placed in the holding device and the air valve is open to a dynamic pressure of 75 p.s.i. Then the stopper is pulled from the flared end of the vertical pipe allowing 1 pint of gravel to fall into the moving air stream. As the gravel falls into the air stream it is projected at high velocity into the test panel.

The following rating system is used to describe the result of the chip test:

0—Total failure; complete removal of the organic film.
5—Minimum commercial acceptability, many chips, maximum size ¼ in.
6—Many chips, maximum size ⅛ in.
7—Moderate numer of chips, maximum size ⅛ in.
8—Moderate number of chips, small topcoat ruptures.
9—Few chips.
10—Topcoat deformation only.

EXAMPLE IB

Similar results were obtained by following the procedure in Example IA except that only .19 part of N-beta-(aminoethyl)gamma-aminopropyltrimethoxy silane was used instead of 0.76 part.

EXAMPLE IC

Similar results were obtained by following the procedure in Example IA except that 1.52 parts of N-beta-(aminoethyl)gamma-aminopropyltrimethoxy silane was used instead of 0.76 part.

EXAMPLE II

A sealer was prepared as in Example IA except that the 95/5 copolymer of methyl methacrylate and 3-(2-methacryloxyethyl)-2,2-spirocyclohexyl oxazolidine was replaced with a methyl methacrylate polymer. This example sealer yields results similar to those in Example IA. However in this case if the sealer does not contain N-beta(aminoethyl)gamma-aminopropyltrimethoxy it exhibits total failure in a 0° F. Gravelometer Chip Test.

EXAMPLE III

A sealer was prepared as in Example IA using N-beta(aminoethyl)gamma-aminopropyltriethoxysilane in place of N-beta(aminoethyl)gamma-aminopropyl-trimethoxysilane. Similar results were obtained.

EXAMPLE IV

A clear sealer was prepared in the following manner:

| | Parts |
|---|---|
| Toluene | 8.88 |
| Acetone | [1] 10.21 |
| N - beta(aminoethyl)gamma - aminopropyltrimethoxysilane | [2] .76 |
| Ethylene glycol monoethyl ether | [3] 12.28 |
| 200,000 molecular weight polymer of epichlorohydrin and bisphenol-A 36% solids in methyl ethyl ketone | [4] 36.28 |
| Toluene | [5] 31.59 |
| Total | 100.00 |

[1] Mix 10 minutes.
[2] Mix 15 minutes.
[3] Add slowly with mixing—mix until uniform.
[4] Mix 15 minutes.
[5] Add mix until uniform.

This sealer was applied in film thickness of 0.1 to 0.5 mil to baked sheet metal primer and sanded steel as indicated in Example IA. It was then baked 15 minutes at 200° F. This was followed by an automotive acrylic lacquer topcoat as in Example IA. This system was tested in a 0° F. Gravelometer Chip Tester and found to have excellent chip resistance.

EXAMPLE V

A sealer composition was prepared using the mill base of Example IA as follows:

| | Parts |
|---|---|
| Mill base | 10.43 |
| 95/5 copolymer of methyl methacrylate and 3-(2-methacryloxyethyl)-2, 2-spirocyclohexyl oxazolidine—40% solids in 3/1 toluene/acetone | 6.74 |
| Acetone | 19.48 |
| Ethylene glycol monoethyl ether | 16.38 |
| Toluene | 8.27 |
| 200,000 molecular weight polymer of epichlorohydrin and bisphenol A—40% solids in methyl ethyl ketone | 38.70 |
| Total | 100.00 |

The example sealer is then reduced 200% by volume with a thinner having the composition:

| | Parts |
|---|---|
| Acetone | 69 |
| Toluene | 28 |
| N - beta(aminoethyl)gamma - aminopropyltrimethoxysilane | 1 |
| Water | 2 |
| Total | 100 |

The said reduced example sealer was applied to a baked sheet metal primer and topcoated as in Example IA. Similar chip results were obtained.

The coating compositions of this invention are useful as sealers particularly for providing adhesion between coatings such as acrylic lacquer topcoats to coatings such as alkyd resins, epoxy esters and oils which traditionally are nonadhesive to each other. These compositions are also useful for bonding topcoats or other organic films to such substrates as metal, fiberglass, rubber, glass, wood, plastics, cotton and other fabrics, and other organic substrates. These are particularly useful for bonding acrylic automotive topcoats to high baked sheet metal primers. These are also useful for bonding decorative enamel finishes such as are found on household appliances to metal or other organic substrates. Another use is in bonding an automotive topcoat to metals, particularly bright metals such as chrome, bright aluminum and stainless steel.

We claim:

1. A sealer composition which comprises a binder dissolved in an organic solvent, said binder comprising the following components:
   (a) from about 50 to about 99 parts by weight of a high molecular weight epoxy resin;
   (b) from 0 to about 50 parts by weight of an acrylic polymer selected from the group consisting of homopolymers of $C_1$ to $C_{18}$ acrylates, $C_1$ to $C_{18}$ methacrylates, acrylonitrile, methacrylonitrile and copolymers containing monomeric units selected from the group consisting of hydroxy aminopropyl methacrylate, 3-(2-methacryloxyethyl) - 2,2 - spirocyclohexyl oxazolidine, 3-amino-3-hydroxy propyl methacrylate, diethyl aminoethyl methacrylate, aminoethyl vinyl ether, 2-aminopropyl methacrylate, 2-aminoethyl methacrylate, 2 - (1 - aziridinyl)ethyl methacrylate, t-butyl aminoethyl methacrylate, dimethyl aminoethyl methacrylate, N-2-hydroxypropyl methacrylamide and N-2-hydroxyethyl methacrylamide; and
   (c) from about 1 to about 25 parts by weight of a trialkoxysilane having a structural formula,

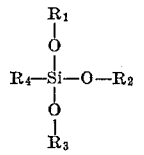

wherein $R_1$, $R_2$ and $R_3$ are individually selected from the group of methyl, ethyl and propyl, and wherein $R_4$ is a monovalent adhesion-promoting radical having the following structural formula $$-(CH_2)_m-R_5$$

wherein $m$ is an integer of 0 to 3 and wherein $R_5$ is $-CH_2NH_2$; $-CH_2N(C_2H_4OH)_2$;

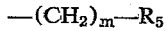

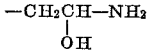

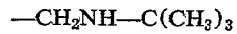

or

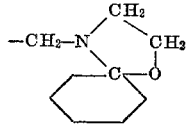

the sum of said binder components being equal to 100 parts by weight.

2. A sealer composition of claim 1 wherein $R_4$ is a monovalent adhesion-promoting radical selected from the group consisting of N-bis(beta-hydroxyethyl)gamma-aminopropyl, gamma-aminopropyl, and N-beta(aminoethyl)gamma-aminopropyl.

3. A sealer composition of claim 2 wherein $R_4$ is N-beta(aminoethyl)gamma-aminopropyl.

4. A sealer composition of claim 3 wherein the (a) high molecular weight epoxy resin is epichlorohydrin-bisphenol A polymer having a molecular weight of from about 20,000 to about 200,000.

5. A sealer composition of claim 4 wherein the acrylic polymer is an adhesion-promoting copolymer containing monomeric units selected from the group of hydroxy aminopropyl methacrylate, 3-(2-methacryloxyethyl)-2, 2-spirocyclohexyl oxazolidine, 3-amino-3-hydroxypropyl methacrylate, diethyl aminoethyl methacrylate, aminoethyl vinyl ether, 2-aminopropyl methacrylate, 2-aminoethyl methacrylate, 2-(1-aziridinyl)-ethyl methacrylate, t-butyl aminoethyl methacrylate, dimethyl aminoethyl methacrylate, N-2-hydroxypropyl methacrylamide and N-2-hydroxyethyl methacrylamide.

6. A sealer composition of claim 5 wherein the acrylic polymer is a copolymer formed from about 95 parts of methyl methacrylate and about 5 parts of 3-(2-methacryloxyethyl)-2,2-spirocyclohexyl oxazolidine.

7. A sealer composition of claim 6 wherein the epichlorohydrin-bisphenol A polymer has a molecular weight of about 200,000.

8. A sealer composition of claim 7 wherein the acrylic polymer is present in an amount of about 18 parts, the high molecular weight epoxy resin is present in an amount of about 77 parts, and the trialkoxysilane is present in an amount of about 5 parts; the sum of said components being equal to 100 weight parts.

9. A sealer composition of claim 8 wherein the binder is dissolved in a combination of organic solvents which consists essentially of acetone, toluene, ethylene glycol monoethyl ether and methyl ethyl ketone.

10. A sealer composition of claim 9 wherein the binder is dissolved in a combination of organic solvents which consists essentially of acetone, toluene, ethylene glycol monoethyl ether, methyl ethyl ketone and isopropanol.

11. A sealer composition of claim 9 which contains pigmentation in an amount of up to 30% pigment volume concentration.

12. A sealer composition of claim 11 which contains pigmentation comprising about 49% titanium dioxide, about 49% aluminum silicate and about 2% carbon black; the total pigmentation being present in an amount of about 9% pigment volume concentration.

13. A metal substrate coated with the sealer composition of claim 1.

14. An alkyl resin based primer substrate coated with the composition of claim 1.

15. An epoxy ester substrate coated with the composition of claim 1.

16. A modified oil based film substrate coated with the composition of claim 1.

17. A plastic substrate coated with the composition of claim 1.

18. A sealer composition of claim 4 wherein the acrylic polymer contains a monomer selected from the group consisting of methyl methacrylate, methyl acrylate, ethyl methacrylate, ethyl acrylate and combinations of these.

19. A sealer composition of claim 1 wherein the binder comprises:
(a) from about 75 to about 99 parts of epichlorohydrin-bisphenol A polymer having a molecular weight of about 20,000 to about 200,000; and
(b) from about 1 to about 25 parts of N-beta(aminoethyl)gamma aminopropyl trimethoxy silane,
the sum of components (a) and (b) being 100 weight parts.

20. A process for preparing a sealer composition of claim 1 having a binder dissolved in an organic solvent which comprises the following based on a total of 100 weight parts binder:
(a) combining from about 1 to about 25 parts of a trialkoxysilane with an amount of organic solvent and from 0 part to an amount of nonreactants such that the concentration of trialkoxysilane is less than about 1 part of trialkoxysilane per 10 parts of the sum of said organic solvent and said nonreactants, said trialkoxysilane having a structural formula,

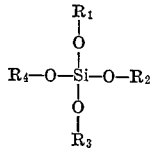

wherein $R_1$, $R_2$ and $R_3$ are individually selected from the group of methyl, ethyl and propyl, and wherein $R_4$ is a monovalent adhesion-promoting radical having the structural formula, $$-(CH_2)_m-R_5$$

wherein $m$ is an integer of 0 to 3 and wherein $R_5$ is $-CH_2NH_2$; $-CH_2N(C_2H_4OH)_2$;

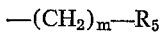

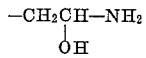

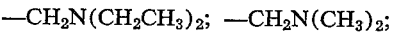

or

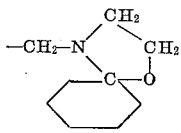

followed by
(b) dissolving from 0 part to about 50 parts of an acrylic polymer selected from the group consisting of homopolymers of $C_1$ to $C_{18}$ acrylates, $C_1$ to $C_{18}$ methacrylates, acrylonitrile, methacrylonitrile and copolymers containing monomeric units selected from the group consisting of hydroxy aminopropyl methacrylic, 3-(2-methacryloxyethyl)-2, 2-spirocyclohexyl oxazolidine, 3-amino-3-hydroxypropyl methacrylate, diethyl aminoethyl methacrylate, aminoethyl vinyl ether, 2-aminopropyl methacrylate, 2-aminoethyl methacrylate, 2-(1-aziridinyl)ethyl methacrylate, t-butyl aminoethyl methacrylate, dimethyl aminoethyl methacrylate, N-2-hydroxypropyl methacrylamide and N-2-hydroxyethyl methacrylamide in the organic solvent; and
(c) dissolving from about 50 to about 99 parts of a high molecular weight epoxy resin in the organic solvent.

21. A process of claim 20 wherein the trialkoxysilane is selected from the group consisting of N-bis(betahydroxyethyl)gamma-aminopropyl triethoxy silane, gamma-aminopropyl triethoxy silane and N-beta(aminoethyl)-gamma-aminopropyl trimethoxy silane.

22. A process of claim 21 wherein the high molecular weight epoxy resin is epichlorohydrin-bisphenol A polymer having a molecular weight of from about 20,000 to about 200,000.

23. A process of claim 22 wherein the concentration of trialkoxysilane is less than about 1 part of trialkoxysilane per about 30 parts of the sum of said organic solvent and said nonreactants.

References Cited

UNITED STATES PATENTS

| | | | |
|---|---|---|---|
| 3,008,914 | 11/1961 | Fry | 260—837 X |
| 3,048,552 | 8/1962 | Fang | 260—837 X |
| 3,088,847 | 5/1963 | Pines. | |
| 3,150,116 | 9/1964 | Masters. | |
| 3,177,090 | 4/1965 | Bayes et al. | |
| 3,252,825 | 5/1966 | Marzocchi et al. | |

MORRIS LIEBMAN, Primary Examiner

L. T. JACOBS, Assistant Examiner

U.S. Cl. X.R.

117—132, 138.8; 260—33.2, 33.4, 33.6, 37, 837